United States Patent
Wollenhaupt et al.

(10) Patent No.: US 8,986,085 B2
(45) Date of Patent: Mar. 24, 2015

(54) METHOD AND DEVICE FOR CONTROLLING EQUIPMENT FOR AIR CONDITIONING A VEHICLE SEAT, AND CONTROL EQUIPMENT THEREFOR

(75) Inventors: Ralf Wollenhaupt, Helmstedt (DE); Matthias Pietsch, Koenigslutter (DE); Matthias Michanicki, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 771 days.

(21) Appl. No.: 10/911,060

(22) Filed: Aug. 3, 2004

(65) Prior Publication Data

US 2005/0070219 A1 Mar. 31, 2005

Related U.S. Application Data

(63) Continuation-in-part of application No. 10/129,384, filed as application No. PCT/EP00/10341 on Oct. 20, 2000, now abandoned.

(30) Foreign Application Priority Data

Nov. 6, 1999 (DE) .................................. 199 53 385

(51) Int. Cl.
*A47C 7/74* (2006.01)
*B60N 2/56* (2006.01)

(52) U.S. Cl.
CPC ............ *B60N 2/5635* (2013.01); *B60N 2/5685* (2013.01); *B60N 2/5657* (2013.01)
USPC .......................... 454/120; 454/75; 297/180.12

(58) Field of Classification Search
USPC ............ 454/75, 120, 907; 219/202, 229, 248, 219/251, 386, 545, 548, 217, 549, 552, 497, 219/527–529; 297/180.12, 216
See application file for complete search history.

(56) References Cited

U.S. PATENT DOCUMENTS

| | | | |
|---|---|---|---|
| 4,064,387 A | 12/1977 | McMullan | |
| 4,981,324 A | 1/1991 | Law | |
| 5,029,939 A | 7/1991 | Smith et al. | |
| 5,653,741 A | 8/1997 | Grant | |
| 5,921,100 A * | 7/1999 | Yoshinori et al. | 62/244 |
| 5,921,314 A * | 7/1999 | Schuller et al. | 165/43 |
| 5,934,748 A | 8/1999 | Faust et al. | |
| 6,079,485 A * | 6/2000 | Esaki et al. | 165/43 |
| 6,079,776 A | 6/2000 | Breitner et al. | |
| 6,105,667 A * | 8/2000 | Yoshinori et al. | 165/202 |
| 6,164,719 A | 12/2000 | Rauh | |
| 6,186,592 B1 | 2/2001 | Orizaris et al. | |
| 6,291,803 B1 | 9/2001 | Fourrey | |
| 6,304,803 B1 | 10/2001 | Dao | |
| 6,439,658 B1 | 8/2002 | Ganz et al. | |

FOREIGN PATENT DOCUMENTS

| | | |
|---|---|---|
| DE | 33 04 419 | 8/1983 |
| DE | 41 41 224 | 6/1993 |
| DE | 43 08 119 | 9/1994 |

(Continued)

*Primary Examiner* — Gregory A Wilson

(74) *Attorney, Agent, or Firm* — Kenyon & Kenyon LLP

(57) ABSTRACT

An apparatus for controlling a device for air conditioning a vehicle seat includes at least one heating device for heating the vehicle seat and at least one ventilating device for ventilating the vehicle seat, as well as a device for operating the same. In order to adapt the air conditioning of the vehicle seat to the individual, subjective needs of the person using it, it is provided that, in response to a manually switched on ventilating device, the heating device is automatically regulated, at least as a function of a seat surface temperature.

21 Claims, 3 Drawing Sheets

(56) References Cited

FOREIGN PATENT DOCUMENTS

| DE | 197 03 516 | 5/1998 |
| DE | 197 52 135 | 6/1999 |
| DE | 199 10 390 | 9/1999 |
| DE | 198 51 979 | 5/2000 |
| EP | 0 809 576 | 12/1997 |
| WO | WO 96/25301 | 8/1996 |
| WO | WO 98/55340 | 12/1998 |
| WO | WO 99/27430 | 6/1999 |

* cited by examiner

METHOD AND DEVICE FOR CONTROLLING EQUIPMENT FOR AIR CONDITIONING A VEHICLE SEAT, AND CONTROL EQUIPMENT THEREFOR

CROSS-REFERENCE TO RELATED APPLICATIONS

The present application is a continuation-in-part of U.S. patent application Ser. No. 10/129,384, which is a National Stage Application of PCT International Application No. PCT/EP00/10341, filed on Oct. 20, 2000, each of which is expressly incorporated herein in its entirety by reference thereto.

FIELD OF THE INVENTION

The present invention relates to a method for controlling an apparatus for air conditioning a vehicle seat, which includes at least one heating device for heating the vehicle seat and at least one ventilating device for ventilating the vehicle seat, a device for controlling an apparatus for controlling a device for air conditioning a vehicle seat, which includes at least one heating device for heating the vehicle seat, at least one ventilating device for ventilating the vehicle seat, a control device which generates command signals for controlling the heating device and the ventilating device, and an operating device for the manual operation of the heating device and the ventilating device, as well as a device for operating equipment for air conditioning a vehicle seat, which includes at least one heating device for heating and at least one ventilating device for ventilating the vehicle seat.

BACKGROUND INFORMATION

Certain methods and equipment of this type are believed to be conventional. Seat heating historically originated from the idea of making passengers feel more comfortable even in open vehicles. A further condition arose from the idea of creating seat heating for the purpose of bridging the heating gap due to the heating-up time of the heating system which is sluggish apart from this. Vehicle seat heating may be a conventional feature intended to enhance seating comfort. Beyond that, however, there are also measures arising from the fact that motor vehicles are operated in all seasons in many climatic zones.

During the summer months motor vehicles are usually air-conditioned, so as to have a bearable climate in the passenger compartment. Thus, proceeding from this, it is believed to be conventional that vehicle seats may be designed not only to be heatable but also air conditioned.

While driving during the summer months, one may encounter situations in which weather conditions and temperatures lead to an increased development of perspiration. In motor vehicles, this may lead to the effect of the so-called wet back, e.g., on longer trips. In relation to this, it is believed to be conventional that heat vehicle seats may not only be heated as discussed above, but also ventilated. On the one hand, it may be important to carry off the dampness between passenger and vehicle seat, and on the other hand, to achieve a comfortable vehicle seat temperature.

German Published Patent Application No. 197 03 516 describes a vehicle seat which is provided with ventilation equipment for aerating the seat cushion, as well as a heating device for heating the cushion. In order to ensure great seat climate comfort, which, on the one hand, excludes perspiring and, on the other hand, excludes undercooling or excessive cooling of the user of the seat, a control device is provided which is connected on its input side to a temperature sensor positioned in the seat, and on its output side to the electrical switching circuits of the ventilation equipment and the heating equipment. In this manner, then, seat cooling and seat heating are fully and automatically regulated.

PCT International Published Patent Application No. WO 96/25301 describes a climate seat in which the inner side of the seat contact surface allows passage of conditioned air by an air conditioning device. An electrical heating element is arranged in the vicinity of the inner side of the seat contact surface, for heating the seat contact surface. A temperature sensing arrangement detects the temperature in the area of the seat contact surface. In order to achieve fast setting of the seat temperature to any given desired temperature, independent of the surrounding conditions, regulating equipment is provided, which is in contact with both the air conditioning equipment and the electrical heating element, and which regulates these in correspondence to a predefined temperature setpoint value as a function of the temperature measured by the temperature sensor equipment. Here too, no influence by the passenger on the automatic operation is possible.

European Published Patent Application No. 0 809 576 describes a climate seat, which carries out the full air conditioning in automatically regulated fashion.

Further implementations of seat air conditioning are described, as, for example, in PCT International Published Patent Application No. WO 98/55340, in which a seat air conditioning device has an air-permeable foundation arranged under a seat surface, and a heating element positioned in the foundation or between the seat surface and the foundation. The foundation and the heating element are formed mat-like, and are essentially oriented parallel to each other, and approximately of the same size with respect to surface extension. In the final analysis, the air permeability here creates the air conditioning or rather, gives access to the air flow.

German Published Patent Application No. 197 52 135 describes a method for temperature-independent regulation of the heat flow of a seat heating device, having a sensor element for temperature recording, and after switching on the seat heating device, the sensor registering the temperature, as a function of the difference of the sensor temperature from a comparison value, the heating phase duration is determined, and subsequently a heating phase is switched on for this duration. This relates for the most part to heating the seat, but ignores completely the aspect of full air conditioning and thus also of ventilation and possibly cooling.

Thus an overall disadvantage is believed to be created, in that the subjective feel of the person on the seat remains completely ignored, in the case of the arrangements mentioned above. Influence of the direct kind is avoided, and instead, a complete temperature-regulated guidance of the system is provided. However, it remains worth considering whether uncontrolled cooling, which ignores the subjective feel of the person in question, may lead to health consequences or even damage to health. Seen from that point of view, systems which are regulated exclusively in fully automatic fashion, even if temperature-regulated, represent an insufficient arrangement.

SUMMARY

An example embodiment of the present invention may provide air conditioning of a vehicle seat more adaptably toward individual, subjective requirements of a respective using person.

Example embodiments of a method according to the present invention and a device according to the present invention are described below.

According to an example embodiment of the present invention, a device for air conditioning a vehicle seat is adjusted manually by the user within specified limits, along with its heating device and its ventilating device. It may be ensured that, in the case of a ventilating device that is switched on by the user, undercooling does not occur, that, while the ventilation device is switched on, the heating device for heating the vehicle seat is regulated automatically at least as a function of one seat surface temperature.

According to an example embodiment of the present invention, it may be provided that specified setpoint values of the seat surface temperature are assigned to the settings of the ventilating device, at higher settings of the ventilating device, e.g., lower setpoint values for the temperature being provided, so as, on the one hand, to protect the user from undercooling, but also so as not to minimize the effect of the ventilation in an undesired manner.

Since the air is aspirated from the passenger compartment by the ventilating device, undercooling may occur because of a draft, when the user activates the ventilating device at air temperatures that are too low. This case may appear when the performance of the seat heating is not sufficient for heating the air, blown by the ventilating device toward the user, to a specified value or a setpoint value. For this reason, it may be provided, according to an example embodiment of the present invention, that in this case the control device may give no command signal for switching on the ventilating device, despite of manual operation of the ventilating device.

It may also be provided, independent of the performance of the seat heating device below a fixed threshold value for the passenger compartment temperature, not to switch on or off the ventilating device, although a manual operation by the user has taken place, in order to avoid an unnecessary source of noise.

According to an example embodiment of the present invention, it may be provided that the heating device, in addition to being regulated as a function of a seat surface temperature, is also regulated as a function of sunlight irradiation into the vehicle and/or of the surface dampness content of the vehicle seat. This regulation may be carried out, both during an automatic regulation of the heating device during the manual setting of the ventilation, and during manual setting of seat heating.

In the case of a manually operated heating device, automatic switching in the ventilating device may not be provided.

According to an example embodiment of the present invention, it may be provided that heating devices are provided, both for the heating of the seat cushion and for the heating of the seat back of the vehicle seat, different setpoint values being specified for their regulation, at least for the seat surface temperature.

An example embodiment of the present invention relates to an operating device for air conditioning a vehicle seat. A single operating element, which may be designed to be bidirectional and having several click-in steps, may be provided for operating both the heating device and the ventilating device of the vehicle seat.

According to an example embodiment of the operating device according to the present invention, the heating device is able to be switched between two click-in steps or haptic stops of the operating element in stepless fashion. In addition, the ventilating device is also able to be operated in stepless fashion between at least two click-in steps or haptic stops of the operating element.

According to an example embodiment, between the two adjustment possibilities, a click-in step or a haptic stop that are capable of being felt are provided at which both the heating device and the ventilating device are switched off.

According to an example embodiment of the present invention, a method for controlling an apparatus for air conditioning a vehicle, in which the apparatus includes at least one heating device configured to heat the vehicle seat and at least one ventilation device configured to ventilate the vehicle seat, includes automatically regulating the heating device to heat the seat at least as a function of a seat surface temperature, when the ventilation device is manually switched on.

The method may include switching on at least one of (a) the ventilation device and (b) the heating device by an operator in at least one of (a) a stepwise manner and (b) a stepless manner.

The method may include assigning a specified setpoint values of the seat surface temperature to settings of the ventilation device.

A setpoint value curve of the seat surface temperature may be continuous at least over specified ranges.

The method may include one of (a) switching off and (b) not switching on the manually operated ventilation device at an insufficient performance of the heating device to reach a setpoint value of the seat surface temperature.

The method may include one of (a) switching off and (b) not switching on the manually operated ventilation device below a threshold value for a passenger compartment temperature.

The method may include not switching on the ventilation device in response to a manually operated heating device.

The heating device may regulated in the regulating step as a function of output signals of at least one of (a) a device configured to record irradiation of sunlight into a vehicle and (b) a device configured to record surface dampness of the vehicle seat.

The at least one heating device may include at least one heating device configured to heat a seat back of the vehicle seat and at least one heating device configured to heat a seat cushion of the vehicle seat, and the at least one heating device configured to heat the seat back of the vehicle seat and the at least one heating device configured to heat the seat cushion of the vehicle seat may be regulated in the regulating step in accordance with different setpoint values at least for the seat surface temperature.

According to an example embodiment of the present invention, an apparatus of controlling a device for air conditioning a vehicle seat includes: at least one heating device configured to heat the vehicle seat; at least one ventilation device configured to ventilate the vehicle seat; a control unit configured to generate command signals to control the heating device and the ventilation device, the control unit configured to automatically regulate the heating device when the ventilation device is manually switched on at least as a function of a seat surface temperature; and an operation device configured to manually operate the heating device and the ventilation device.

The operation device may be configured to switch on the ventilation device and the heating device in at least one of (a) a stepwise manner and (b) a stepless manner.

The ventilation device may include settings, and specified setpoint values of the seat surface temperature may be assignable to the settings of the ventilation device.

A setpoint value curve of the seat surface temperature may be continuous.

The control unit may be configured to generate a command signal to one of (a) switch off and (b) not switch on the ventilation device operated by the operation device if a performance of the heating device is insufficient to reach the setpoint value of the seat surface temperature.

The control unit may be configured to one of (a) switch off and (b) not switch on the ventilation device operated by the operation device below a threshold value for a passenger compartment temperature.

The control unit may be configured to not switch on the ventilation device in response to a manually operated heating device.

The control unit may be connected to at least one of (a) a device configured to record sunlight irradiation into a vehicle and (b) a device configured to record surface dampness of the vehicle seat, and the control device may be configured to generate a command signal to control the heating device as a function of output signals of at least one of (a) the device configured to record sunlight irradiation into a vehicle and (b) the device configured to record surface dampness of the vehicle seat.

The at least one heating device may include at least one heating device configured to heat a seat back of the vehicle seat and at least one heating device configured to heat a seat cushion of the vehicle seat, and the control device may be configured to regulate the at least one heating device configured to heat the seat back of the vehicle seat and the at least one heating device configured to heat the seat cushion of the vehicle seat in accordance with different setpoint values at least for the seat surface temperature.

According to an example embodiment of the present invention, an apparatus for controlling a device for air conditioning a vehicle seat includes: at least one heating device configured to heat the vehicle seat; at least one ventilation device configured to ventilate the vehicle seat; and a single control element configured to set both the heating device and the ventilation device.

The control element may include a bidirectional control element and includes a plurality of click-in steps.

The control element may be configured to switch on the heating device in a stepless manner between at least to click-in steps.

The control element may be configured to switch on the ventilation device in a stepless manner between at least two click-in steps.

The click-in steps may include click-in steps corresponding to switch-on of the heating device, click-in steps corresponding to switch-on of the ventilation device and a click-in step between the click-in steps corresponding to switch-on of the heating device and the click-in steps corresponding to switch-on of the ventilation device corresponding to a switch-off of both the heating device and the ventilation device.

Example embodiments of the present invention are described in greater detail below with reference to the appended Figures.

DETAILED DESCRIPTION

Figure 1:
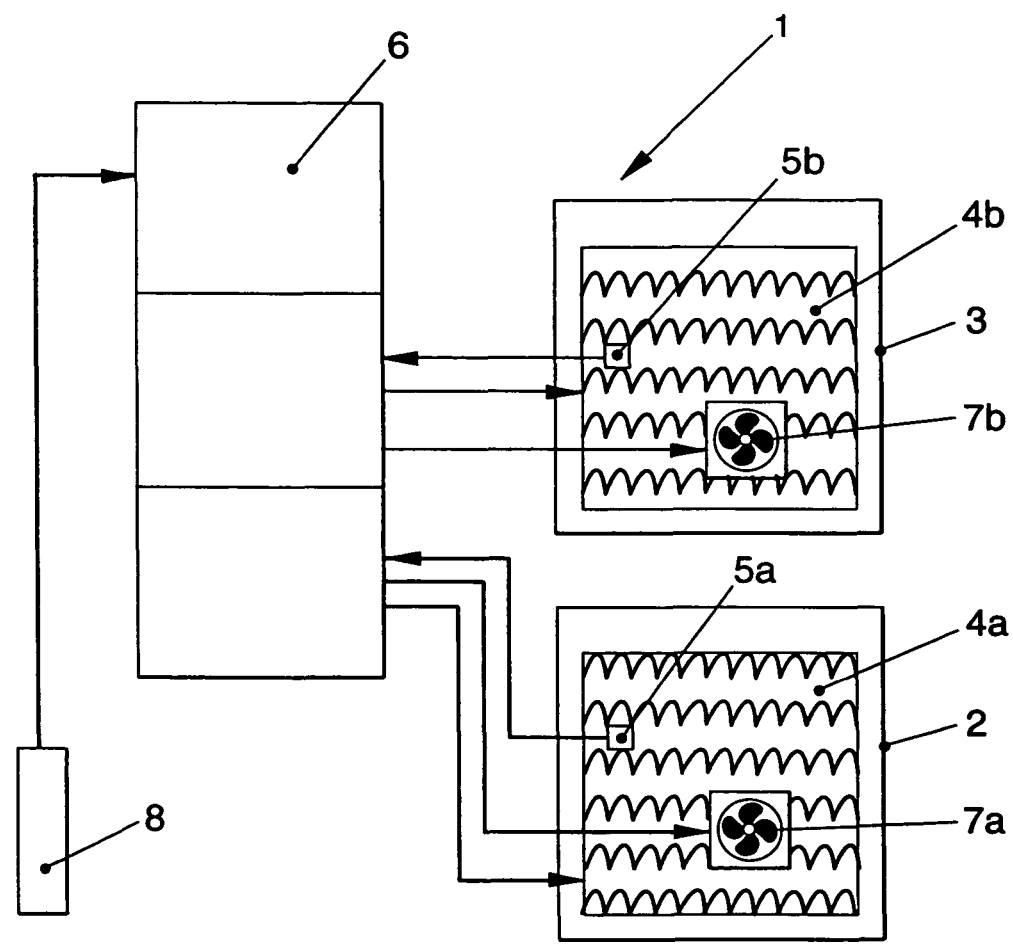
FIG. 1 is a schematic view of an apparatus for controlling a device for air conditioning a vehicle seat.

Vehicle seat 1 illustrated schematically in FIG. 1, that may be constructed in a conventional manner, includes a seat cushion 2 and a seat back 3. The two parts of the seat have separate heating devices 4a and 4b respectively. Below the surface, there is in each case a device 5a, 5b for recording the surface temperature of the respective seat part 2, 3, whose output signals are supplied to a control unit 6, which forms the command signal for the heating device and the ventilating device. Furthermore, both seat cushion 2 and seat back 3 are equipped with a ventilating device 7a, 7b, illustrated schematically, which are made up of one or more fans or ventilators that aspirate the air from the passenger compartment and blow it into the vehicle seat. The apparatus according to an example embodiment of the present invention also has an operating device 8, with the aid of which each passenger is able to set heating devices 4a and 4b and ventilating devices 7a and 7b to suit him/her, which represent the different levels of air volume flow of ventilating devices 7a, 7b and the different heating temperatures of heating devices 4a, 4b. For this, operating device 8 is arranged as a single bidirectional set wheel 9, and illustrated in greater detail in FIG. 2.

To that end, set wheel 9 has five negotiable click-in steps 10a to 10e. In middle click-in step 10c or setting, and in a specified range 11 about this click-in step, both heating devices 4a and 4b and ventilating devices 7a and 7b are completely switched off. Click-in steps 10a and 10b represent the maximum and the minimum of the temperature range that is able to be set via heating devices 4a and 4b, the passenger being able to set the temperature in a stepless manner between the two click-in steps. Click-in step 10d reproduces a setting of the weakest ventilating step, and click-in step 10e reproduces the setting of the strongest ventilating step of ventilating devices 7a, 7b.

As illustrated in FIG. 1, both seat cushion 2 and seat back 3 have their own heating device 4a, 4b. These are separately regulated by control unit 6, a common temperature setpoint value being specified by the passenger via operating device 8. During the pure heating operation, which is able to be set between click-in steps 10a and 10b, a pure temperature regulation takes place as a function of actual temperature values measured by devices 5a and 5b, separately for seat cushion 2 and seat back 3. Ventilating devices 7a and 7b are completely switched off.

Figure 3:
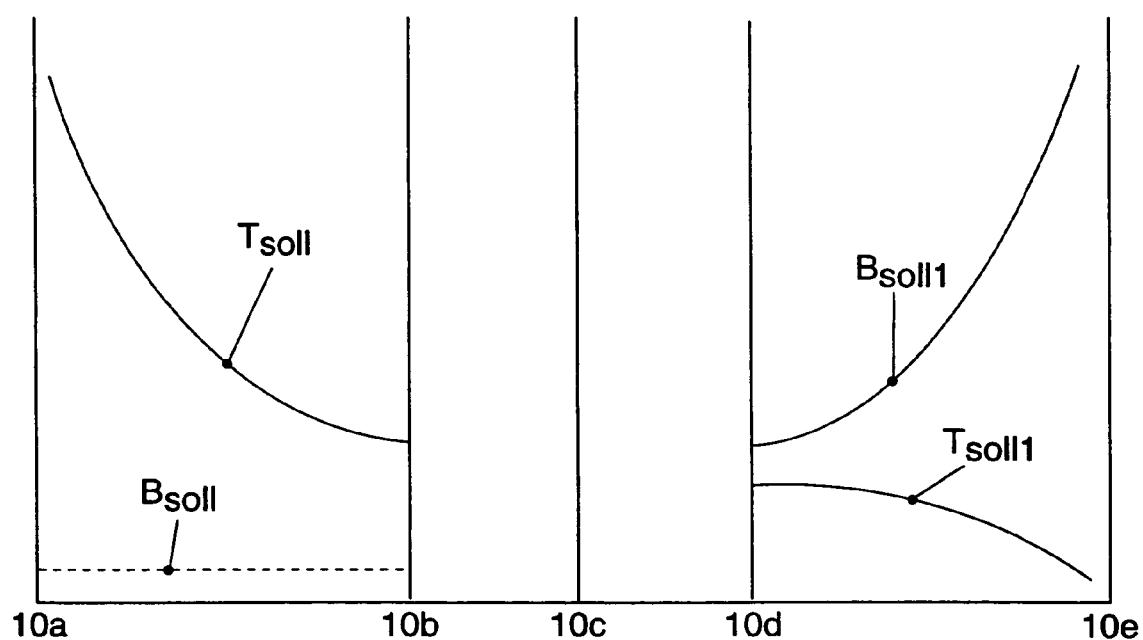
FIG. 3 illustrates examples of the setpoint value curves for the heating device and the ventilating device of a vehicle seat.

In FIG. 3, an example is illustrated for the setpoint value curves for heating devices 4a, 4b and for ventilating devices 7a, 7b plotted against the different click-in settings 10a through 10e. It may be recognized that, between the two click-in steps for the heating operation as well as for the ventilating operation, a continuous curve of the setpoint value characteristic curves is given, the curve of temperature setpoint value $T_{soll}$ being selected, in a manner capable of being felt, such that at click-in step 10a a maximum temperature is set, which decreases continuously and reaches its minimum at click-in step 10b. Since ventilating devices 7a, 7b are switched off during the manual operation of the heating devices, their setpoint value $B_{soll}$ is also equal to zero.

Figure 2:
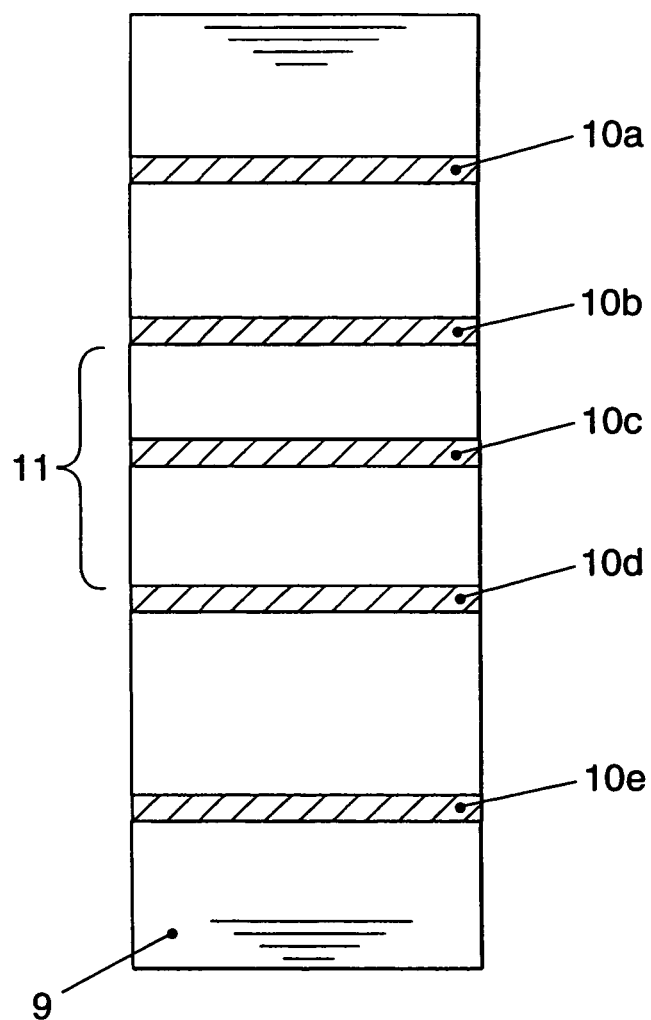
FIG. 2 schematically illustrates an operating device according to an example embodiment of the present invention.

In order manually to set the ventilating devices, set wheel 9 of the operating device is set to a setting between click-in steps 10d and 10e (FIG. 2). In accordance with the manual setting by the passenger, control device 6 generates a command signal for the ventilating devices according to setpoint value characteristic curve $B_{soll1}$. In order to protect the passenger from undercooling, control unit 6 also automatically generates a command signal for heating devices 4a and 4b of seat cushion 2 and seat back 3 according to setpoint value characteristic curve $T_{soll}$, the setpoint values for the heating devices being below those in the pure heating operation. In this context, if the performance of one or both heating devices is not sufficient for heating the air blown by ventilating devices 7a and 7b toward the passenger to a specified level, because the air temperatures in the passenger compartment are too low, ventilating devices 7a and 7b, despite manual operation, are not switched on until the temperature of the air in the passenger compartment has reached a specified threshold value. The apparatus is operated during this time only using heating devices 4a, 4b. If, during the operation of ventilating devices 7a and 7b, the temperature in the passenger compartment falls below the threshold value or below a second specified threshold value, ventilating devices 7a, 7b are switched off. In this context, the temperature in the passenger compartment may be monitored, for example, by a device for recording the temperature of the air conditioning system of the vehicle.

LIST OF REFERENCE NUMERALS 1 vehicle seat
2 seat cushion
3 seat back
4a heating device
4b heating device
5a device for recording the surface temperature
5b device for recording the surface temperature
6 control unit
7a ventilating device
7b ventilating device
8 operating device
9 set wheel
10a to 10e click-in step
$T_{soll}$ temperature setpoint value
$T_{soll1}$ temperature setpoint value
$B_{soll}$ setpoint value for the ventilating device
$B_{soll1}$ setpoint value for the ventilating device

What is claimed is:

1. A method for controlling an apparatus for air conditioning a vehicle, the apparatus including at least one heating device configured to heat the vehicle seat and at least one ventilation device configured to ventilate the vehicle seat, comprising:
assigning a specified setpoint value curve of a seat surface temperature to settings of the ventilation device;
setting the apparatus to a ventilating mode in which the setpoint value for a seat surface temperature is set below a setpoint value for a seat surface temperature during a non-ventilating mode; and
during the ventilating mode, automatically regulating the heating device to heat the seat at least as a function of a seat surface temperature.

2. The method according to claim 1, further comprising switching on at least one of (a) the ventilation device or (b) the heating device by an operator in at least one of (a) a stepwise manner or (b) a stepless manner.

3. The method according to claim 1, wherein the setpoint value curve of the seat surface temperature is continuous at least over specified ranges.

4. The method according to claim 1, further comprising one of (a) switching off and (b) not switching on a manually operated ventilation device at an insufficient performance of the heating device to reach a setpoint value of the seat surface temperature.

5. The method according to claim 1, further comprising one of (a) switching off and (b) not switching on a manually operated ventilation device below a threshold value for a passenger compartment temperature.

6. The method according to claim 1, further comprising not switching on the ventilation device in response to a manually operated heating device.

7. The method according to claim 1, wherein the heating device is regulated in the regulating step as a function of output signals of at least one of (a) a device configured to record irradiation of sunlight into a vehicle or (b) a device configured to record surface dampness of the vehicle seat.

8. The method according to claim 1, wherein the at least one heating device includes at least one heating device configured to heat a seat back of the vehicle seat and at least one heating device configured to heat a seat cushion of the vehicle seat, the at least one heating device configured to heat the seat back of the vehicle seat and the at least one heating device configured to heat the seat cushion of the vehicle seat regulated in the regulating step in accordance with different setpoint values at least for the seat surface temperature.

9. An apparatus of controlling a device for air conditioning a vehicle seat, comprising:
at least one heating device configured to heat the vehicle seat;
at least one ventilation device configured to ventilate the vehicle seat wherein the ventilation device includes settings, a specified set point value curve of a seat surface temperature assignable to the settings of the ventilation device;
a control unit configured to generate command signals to control the heating device and the ventilation device, the control unit configured to automatically regulate the heating device, during a ventilating mode of the device for air conditioning the vehicle seat in which the setpoint value for a seat surface temperature is set below a setpoint value for a seat surface temperature during a non-ventilating mode, at least as a function of a seat surface temperature; and
an operation device configured to manually operate the heating device and the ventilation device.

10. The apparatus according to claim 9, wherein the operation device is configured to switch on the ventilation device and the heating device in at least one of (a) a stepwise manner or (b) a stepless manner.

11. The apparatus according to claim 9, wherein the setpoint value curve of the seat surface temperature is continuous.

12. The apparatus according to claim 9, wherein the control unit is configured to generate a command signal to one of (a) switch off and (b) not switch on the ventilation device operated by the operation device if a performance of the heating device is insufficient to reach the setpoint value of the seat surface temperature.

13. The apparatus according to claim 9, wherein the control unit is configured to one of (a) switch off and (b) not switch on the ventilation device operated by the operation device below a threshold value for a passenger compartment temperature.

14. The apparatus according to claim 9, wherein the control unit is configured to not switch on the ventilation device in response to a manually operated heating device.

15. The apparatus according to claim 9, wherein the control unit is connected to at least one of (a) a device configured to record sunlight irradiation into a vehicle or (b) a device configured to record surface dampness of the vehicle seat, the control device configured to generate a command signal to control the heating device as a function of output signals of at least one of (a) the device configured to record sunlight irradiation into a vehicle or (b) the device configured to record surface dampness of the vehicle seat.

16. The apparatus according to claim 9, wherein the at least one heating device includes at least one heating device configured to heat a seat back of the vehicle seat and at least one heating device configured to heat a seat cushion of the vehicle seat, the control device configured to regulate the at least one heating device configured to heat the seat back of the vehicle seat and the at least one heating device configured to heat the seat cushion of the vehicle seat in accordance with different setpoint values at least for the seat surface temperature.

17. An apparatus for controlling a device for air conditioning a vehicle seat, comprising:
- at least one heating device configured to heat the vehicle seat;
- at least one ventilation device configured to ventilate the vehicle seat wherein the ventilation device includes settings, a specified set point value curve of a seat surface temperature assignable to the settings of the ventilation device;
- a control unit configured to generate command signals to control the heating device and the ventilation device, the control unit configured to automatically regulate the heating device, during a ventilating mode of the device for air conditioning the vehicle seat in which the setpoint value for a seat surface temperature is set below a setpoint value for a seat surface temperature during a non-ventilating mode, at least as a function of a seat surface temperature; and
- a single, manually-operable control element configured to set both the heating device and the ventilation device.

18. The apparatus according to claim 17, wherein the control element includes a bidirectional control element and includes a plurality of haptic stops.

19. The device according to claim 18, wherein the control element is configured to switch on the heating device in a stepless manner between at least two haptic stops.

20. The device according to claim 18, wherein the control element is configured to switch on the ventilation device in a stepless manner between at least two haptic stops.

21. The device according to claim 18, wherein the haptic stops include haptic stops corresponding to switch-on of the heating device, haptic stops corresponding to switch-on of the ventilation device and a haptic stop between the haptic stops corresponding to switch-on of the heating device and the haptic stops corresponding to switch-on of the ventilation device corresponding to a switch-off of both the heating device and the ventilation device.

* * * * *